US012741419B2

(12) United States Patent
Wei et al.

(10) Patent No.: US 12,741,419 B2
(45) Date of Patent: Sep. 22, 2026

(54) INTERFACIAL AND SUPPORT STRUCTURES FOR INORGANIC MATERIAL PRINTING AND METHODS THEREOF

(71) Applicant: XEROX CORPORATION, Norwalk, CT (US)

(72) Inventors: Junhua Wei, Palo Alto, CA (US); Gregory Brian Anderson, Emerald Hills, CA (US); Daniel Bullard, Palo Alto, CA (US); David Mathew Johnson, San Francisco, CA (US)

(73) Assignee: XEROX CORPORATION, Norwalk, CT (US)

( * ) Notice: Subject to any disclaimer, the term of this patent is extended or adjusted under 35 U.S.C. 154(b) by 133 days.

(21) Appl. No.: 18/471,580

(22) Filed: Sep. 21, 2023

(65) Prior Publication Data

US 2025/0100223 A1 Mar. 27, 2025

(51) Int. Cl.

| | |
|---|---|
| ***B29C 64/40*** | (2017.01) |
| ***B22F 10/43*** | (2021.01) |
| ***B29C 64/188*** | (2017.01) |
| ***B29C 64/227*** | (2017.01) |
| ***B29C 64/336*** | (2017.01) |
| *B33Y 10/00* | (2015.01) |

(Continued)

(52) U.S. Cl.

CPC ............ *B29C 64/336* (2017.08); *B22F 10/43* (2021.01); *B29C 64/188* (2017.08); *B29C 64/227* (2017.08); *B29C 64/40* (2017.08); *B33Y 10/00* (2014.12); *B33Y 30/00* (2014.12); *B33Y 70/00* (2014.12)

(58) Field of Classification Search

CPC ...... B29C 64/188; B29C 64/194; B29C 64/40

See application file for complete search history.

(56) References Cited

U.S. PATENT DOCUMENTS

| | | | | |
|---|---|---|---|---|
| 5,207,371 A * | 5/1993 | Prinz | ...................... | B22F 10/14 228/159 |
| 9,556,525 B2 * | 1/2017 | Dierkes | .................. | B22F 10/28 |

(Continued)

OTHER PUBLICATIONS

3D Printing Nerd, Simplify3D 4.0—PVA Support Interface Layers / Optimize Your Soluble Supports, https://www.youtube.com/watch?v=lCt4XvXgbYl , Jul. 25, 2017 (Year: 2017).*

*Primary Examiner* — Timothy Kennedy

(74) *Attorney, Agent, or Firm* — MH2 Technology Law Group LLP

(57) ABSTRACT

A method of additive manufacturing includes i) forming a first layer, the including a material chosen from an article material, a support structure material and an interfacial material. The method includes ii) forming an additional layer on the first layer, including at least one material chosen from the article material, the support structure material and the interfacial material. The method also includes iii) repeating ii) one or more times to form a three-dimensional build may include an article and at least one support structure attached to the article at an interface, the interface may include the interfacial material formed during one or more of i), ii) or iii), the interfacial material may include a polymer. An additive manufacturing system includes a controller operatively connected to a reservoir, an ejector, and an actuator, the controller being configured to perform the method and form a printed article.

12 Claims, 2 Drawing Sheets

(51) Int. Cl.
*B33Y 30/00* (2015.01)
*B33Y 70/00* (2020.01)

(56) References Cited

U.S. PATENT DOCUMENTS

2017/0173879 A1* 6/2017 Myerberg ............... B22F 12/53
2017/0297098 A1* 10/2017 Myerberg ............... B29C 64/40
2018/0237329 A1* 8/2018 Drewnowski ......... B29C 64/118
2019/0193335 A1 6/2019 Giller et al.
2019/0270240 A1 9/2019 Wolf et al.
2019/0337235 A1 11/2019 Moosberg et al.
2021/0179759 A1 6/2021 Lee et al.
2023/0173744 A1 6/2023 Qui et al.
2025/0100222 A1 3/2025 Wei et al.

* cited by examiner

INTERFACIAL AND SUPPORT STRUCTURES FOR INORGANIC MATERIAL PRINTING AND METHODS THEREOF

TECHNICAL FIELD

The present teachings relate generally to additive manufacturing components and methods and, more particularly, to the use of polymeric materials as supporting or interfacial structures for components fabricated using additive manufacturing.

BACKGROUND

Because additive manufacturing is carried out one layer at a time, support structures are often employed to support the structure during the printing process. These support structures can take the form of, for example, a plurality of pillars that support an overhang structure of a part being printed. The support structures serve multiple functions. For example, they provide structural stability to the layers deposited as an article being printed (sometimes referred to as a "part") widens out from a narrower base region. The support provided by these structures allows more complex geometries to be printed and can allow for reduced weight of the final part. Additionally, support structures allow for improved thermal management during printing, especially when printing metals. These structures provide a path for thermal energy to move from the part to heat sinks, or from heat sources into the part. Support structures can be developed using the same material being used to make the part, or if the printer has the capability to print multiple materials, can be printed from a second material.

One problem with many support structures, especially with metal printing, is they are not easily removed from the part. A significant amount of time and/or money can be spent during "post processing" to fully remove the support structures and smooth or polish the remaining rough areas left on the part surface. Further, such support structures can result in degraded quality of the final printed part surface.

Improved support structures and methods of additive manufacturing that employ the support structures would be a desirable step forward in the art.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A method of additive manufacturing includes i) forming a first layer, the first layer may include at least one material chosen from an article material, a support structure material and an interfacial material. The method also includes ii) forming an additional layer on the first layer, the additional layer may include at least one material chosen from the article material, the support structure material and the interfacial material. The method also includes iii) repeating ii) one or more times to form a three-dimensional build may include an article and at least one support structure attached to the article at an interface, the interface may include the interfacial material formed during one or more of i), ii) or iii), the interfacial material may include a polymer. Implementations of the additive manufacturing method include where the interfacial material may include a polyaryletherketone (PAEK). The interfacial material may include polyether ether ketone (PEEK). The interfacial material may include a material selected from polytetrafluoroethylene (PTFE), polybenzimidazole (PBI), polyetherimide (PEI), polycarbosilane (PCS), or a combination thereof. The article material may include a metal such as an alloy of aluminum. The article material may include a material chosen from glass, salt, or a combination thereof. The interfacial material can be deposited by ejection. The interfacial material can be deposited by sheet dropping. The method of additive manufacturing may include removing a portion of the article from another portion of the article at an interface location. The method of additive manufacturing may include depositing the interfacial material while the article is at an elevated temperature. The method of additive manufacturing may include maintaining a portion of the article at an elevated temperature while forming the interfacial material. The support structure material may include a metal, a glass, a salt, or a combination thereof.

An additive manufacturing system is described, which includes a reservoir configured to receive and melt a print material, an ejector having a nozzle that is fluidly connected to the reservoir to receive melted print material from the reservoir, and a platform positioned opposite the ejector. The system also includes at least one actuator operatively connected to at least one of the platform and the ejector, the at least one actuator being configured to move the at least one of the platform and the ejector relative to one another. The system also includes a controller operatively connected to the reservoir, the ejector, and the at least one actuator, the controller being configured to: i) form a first layer, the first layer may include at least one material chosen from an article material, a support structure material and an interfacial material. The system also includes ii) form an additional layer on the first layer, the additional layer may include at least one material chosen from the article material, the support structure material and the interfacial material. The system also includes iii) repeat ii) one or more times to form a three-dimensional build may include an article and at least one support structure attached to the article at an interface, the interface may include the interfacial material formed during one or more of i), ii) or iii), the interfacial material may include a polymer. Implementations of the additive manufacturing system where the interfacial material may include a polyaryletherketone (PAEK). The interfacial material may include a polybenzimidazole (PBI). The interfacial material may include a polycarbosilane (PCS).

A printed article is disclosed which can include a three-dimensional article, a support structure attached to at least a portion of the three-dimensional article, and an interfacial material affixed between the three-dimensional article and the support structure, and where the interfacial material may include a polymer. The printed article can include where the interfacial material may include a reinforcing filler. The interfacial material further may include a polyaryletherketone (PAEK).

The features, functions, and advantages that have been discussed can be achieved independently in various implementations or can be combined in yet other implementations further details of which can be seen with reference to the following description.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

Figure 1:
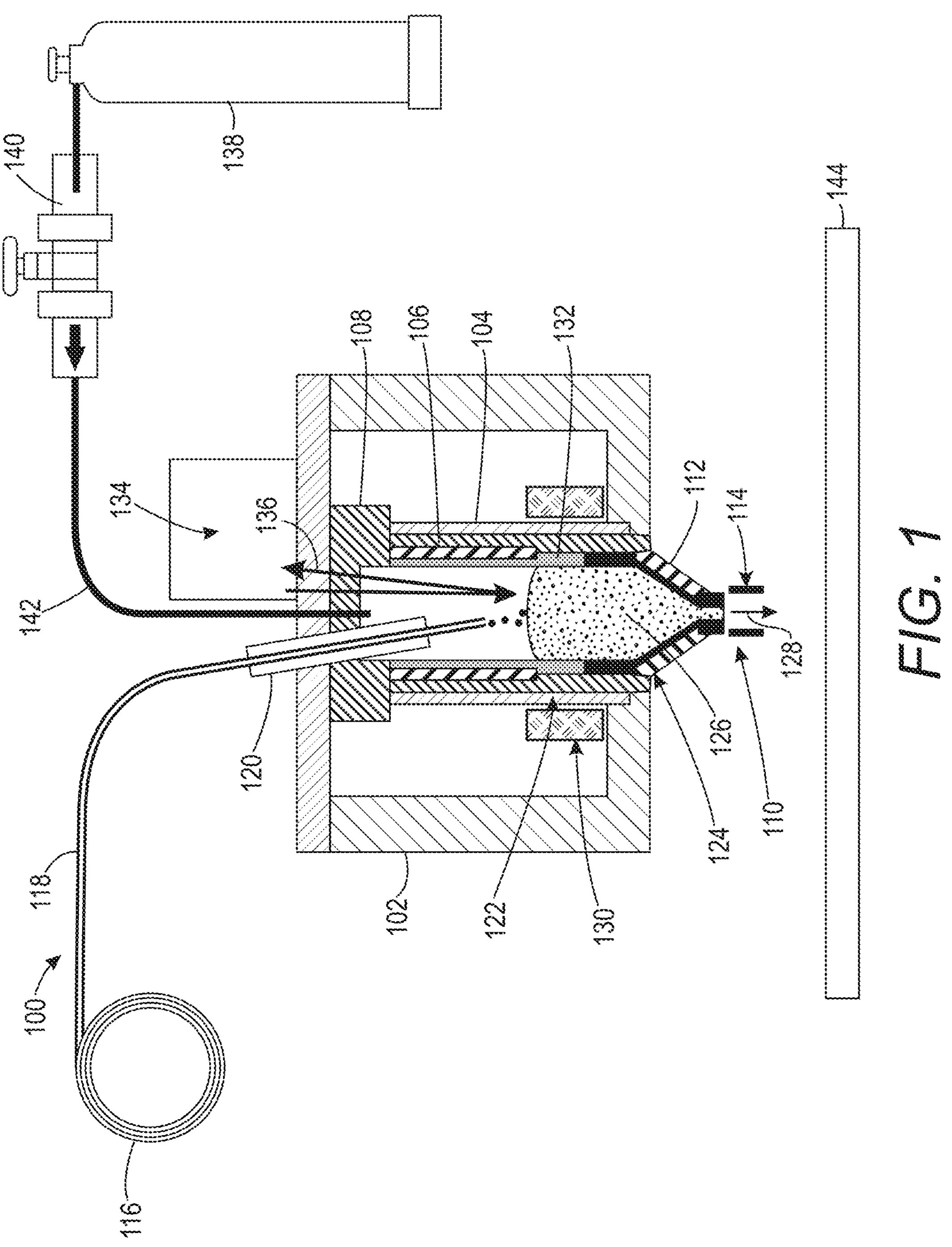
FIG. 1 depicts a schematic cross-sectional view of a single liquid metal ejector jet of a 3D printer (e.g., a MHD printer and/or multi-jet printer) used in additive manufacturing, in accordance with the present disclosure.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts.

The present teachings provide a solution for issues related to interfaces for inorganic printing, such as metals, oxide materials, and salt. An exemplary example of printed polyether ether ketone (PEEK) can be provided as an interface to separate a printed inorganic material object or as a support structure to hold printed inorganic material during an additive manufacturing operation.

Printing an inorganic material to form complex structures can be difficult in certain examples because there are few materials that can withstand >300° C. temperature at ambient conditions while maintaining inactive interfaces between inorganic materials and other materials. An interlayer can be enabling in separating inorganic material during printing or provide support structures during printing. In current examples, the use of another inorganic material that does not react with a first inorganic material as an interface layer can be employed. This method can be limited by the material combination and choices. The present teachings provide the use of an interfacial material, such as PEEK, during printing to demonstrate a condition to improve the interaction and wetting between the interfacial material and an inorganic material. Certain inorganic materials having a melting point from ~300° C. to ~900° C. can be demonstrated to wet on a high-temperature polymer-based material under the proposed conditions in the present teachings. Materials such as PEEK have also been printed on or within structures of several inorganic material substrates while exhibiting good wetting at the proposed conditions.

Due to certain poor adhesive conditions between polymers such as PEEK and other inorganic materials, a printed PEEK cannot stick on the printed inorganic material at room temperature, or the printed inorganic material cannot stick on the printed PEEK when at room temperature. The present teachings provide a printing profile and method that is directed towards keeping PEEK or another interfacial material above its melting point. The molten interfacial material, i.e., PEEK, contacts the inorganic material, which has a melting point above that of the interfacial material, thus improving the interaction during processing. With sufficient supply, pressing, and low pulling forces, interfacial materials as described herein can be printed or applied onto an inorganic material substrate at above its melting point condition to form an integrated structure having good wetting between the materials. With temperature above the melting point of the interfacial material, the inorganic material can be printed onto the molten PEEK substrate with good wetting and form an integrated structure until separation or removal of the two materials separated by the interface, if desired, is completed.

FIG. 1 depicts a schematic cross-sectional view of a single liquid metal ejector jet of a 3D printer (e.g., a MHD printer and/or multi-jet printer) used in additive manufacturing, in accordance with the present disclosure. FIG. 1 depicts a schematic cross-sectional view of a single liquid metal ejector jet of a 3D printer (e.g., a MHD printer and/or multi-jet printer), in accordance with the present disclosure. FIG. 1 shows a portion of a type of drop-on-demand (DOD) or three-dimensional (3D) printer 100. The 3D printer or liquid ejector jet system 100 may include an ejector (also referred to as a body or pump chamber, or a "one-piece" pump) 104 within an outer ejector housing 102, also referred to as a lower block. The ejector 104 may define an inner volume 132 (also referred to as an internal cavity or an inner cavity). A printing material 126 may be introduced into the inner volume 132 of the ejector 104. This inner volume 132 may be considered a reservoir configured to receive and melt a print material within the inner volume 132 of the ejector 104. The printing material 126 may be or include a metal, a polymer, or the like. It should be noted that alternate jetting technology aside from MHD as described herein may be necessary depending on the nature and properties of the print material used in examples of the present disclosure. For example, the printing material 126 may be or include aluminum or aluminum alloy, introduced via a printing material supply 116 or spool of a printing material wire feed 118, in this case, an aluminum wire. The liquid ejector jet system 100 further includes a first inlet 120 within a pump cap or top cover portion 108 of the ejector 104 whereby the printing material wire feed 118 is introduced into the inner volume 132 of the ejector 104. The ejector 104 further defines a nozzle 110, an upper pump 122 area and a lower pump 124 area. One or more heating elements 112 are distributed around the pump chamber 104 to provide an elevated temperature source and maintain the printing material 126 in a molten state during printer operation. The heating elements 112 are configured to heat or melt the printing material wire feed 118, thereby changing the printing material wire feed 118 from a solid state to a liquid state (e.g., printing material 126) within the inner volume 132 of the ejector 104. The three-dimensional 3D printer 100 and ejector 104 may further include an air or argon shield 114 located near the nozzle 110, and a water coolant source 130 to further enable nozzle and/or ejector 104 temperature regulation. The liquid ejector jet system 100 further includes a level sensor 134 system which is configured to detect the level of molten printing material 126 inside the inner volume 132 of the ejector 104 by directing a detector beam 136 towards a surface of the printing material 126 inside the ejector 104 and reading the reflected detector beam 136 inside the level sensor 134.

The 3D printer 100 may also include a power source, not shown herein, and one or more metallic coils 106 enclosed in a pump heater that are wrapped at least partially around the ejector 104. The power source may be coupled to the coils 106 and configured to provide an electrical current to the coils 106. This electrical current can be provided as a pulse, which is delivered at a specific frequency, wherein the frequency determines a rate at which a pulse is delivered to the coils 106, and therefore how often a drop may be ejected from the ejector 104. An increasing magnetic field caused by the coils 106 may cause an electromotive force within the ejector 104, that in turn causes an induced electrical current in the printing material 126. The magnetic field and the induced electrical current in the printing material 126 may create a radially inward force on the printing material 126, known as a Lorenz force. The Lorenz force creates a pressure at an inlet of a nozzle 110 of the ejector 104. The pressure causes the printing material 126 to be jetted through the nozzle 110 in the form of one or more liquid drops 128.

The 3D printer 100 may also include a substrate 144, or platform that is positioned proximate to (e.g., below) the nozzle 110. The ejected drops 128 may land on the substrate 144 and solidify to produce a 3D object. The 3D printer 100 may also include a substrate control motor that is configured to move the substrate 144 while the drops 128 are being jetted through the nozzle 110, or during pauses between when the drops 128 are being jetted through the nozzle 110, to cause the 3D object to have the desired shape and size. The substrate control motor may be configured to move the substrate 144 in one dimension (e.g., along an X axis), in two dimensions (e.g., along the X axis and a Y axis), or in three dimensions (e.g., along the X axis, the Y axis, and a Z axis). In another example, the ejector 104 and/or the nozzle 110 may be also or instead be configured to move in one, two, or three dimensions. In other words, the substrate 144 may be moved under a stationary nozzle 110, or the nozzle 110 may be moved above a stationary substrate 144. In yet another example, there may be relative rotation between the nozzle 110 and the substrate 144 around one or two additional axes, such that there is four or five axis position control. In certain examples, both the nozzle 110 and the substrate 144 may move. For example, the substrate 144 may move in X and Y directions, while the nozzle 110 moves up and/or down in a Y direction. For the purposes of this disclosure, a print bed may also refer to the substrate.

The 3D printer 100 may also include one or more gas-controlling devices, which may be or include a gas source 138. The gas source 138 may be configured to introduce a gas. The gas may be or include an inert gas, such as helium, neon, argon, krypton, and/or xenon. In another example, the gas may be or include nitrogen. The gas may include less than about 10% oxygen, less than about 5% oxygen, or less than about 1% oxygen. In at least one example, the gas may be introduced via a gas line 142 which includes a gas regulator 140 configured to regulate the flow or flow rate of one or more gases introduced into the three-dimensional 3D printer 100 from the gas source 138. For example, the gas may be introduced at a location that is above the nozzle 110 and/or the heating element 112. This may allow the gas (e.g., argon) to form a shroud/sheath around the nozzle 110, the drops 128, the 3D object, and/or the substrate 144 to reduce/prevent the formation of oxide (e.g., aluminum oxide) in the form of an air shield 114. Controlling the temperature of the gas may also or instead help to control (e.g., minimize) the rate that the oxide formation occurs.

The liquid ejector jet system 100 may also include an enclosure 102 that defines an inner volume (also referred to as an atmosphere). In one example, the enclosure 102 may be hermetically sealed. In another example, the enclosure 102 may not be hermetically sealed. In one example, the ejector 104, the heating elements 112, the power source, the coils, the substrate 144, additional system elements, or a combination thereof may be positioned at least partially within the enclosure 102. In another example, the ejector 104, the heating elements 112, the power source, the coils, the substrate 144, additional system elements, or a combination thereof may be positioned at least partially outside of the enclosure 102. While the liquid ejector jet system 100 shown in FIG. 1 is representative of a typical liquid ejector jet system 100, locations and specific configurations and/or physical relationships of the various features may vary in alternate design examples.

Printing systems as described herein or printing systems having other print material feeds and/or ejection systems may alternatively include other printing materials such as plastics or other ductile materials that are non-metals. The print material can include a metal, a metallic alloy, or a combination thereof. A non-limiting example of a printing material can include aluminum. Exemplary examples of printing systems of the present disclosure can include an ejector for jetting a print material, including a structure defining an inner cavity, and a nozzle orifice in connection with the inner cavity and configured to eject one or more droplets of liquid print material, wherein the ejector is configured to form objects, parts, interfacial materials, structures, or support structures as described herein for a three-dimensional printed part.

In other known methods, printers such as those shown in FIG. 1 include a controller that is configured to receive instructions from a computing device or programmed set of coordinates to operate the ejector head to construct various elements of a 3D object. The reservoir or inner volume is configured to receive and melt a print material, while the ejector having a nozzle is fluidly connected to the reservoir to receive melted print material from the reservoir. As the platform is positioned opposite the ejector, at least one actuator operatively connected to at least one of the platform and the ejector is present, where the at least one actuator is configured to move the at least one of the platform and the ejector relative to one another. The controller is further operatively connected to the reservoir, the at least one ejector, and the at least one actuator, the controller being configured to perform various printing method instructions as described herein for producing structures of a three-dimensional object or part as described herein.

An additive manufacturing system, can include one or more of the above-referenced features or aspects, including a reservoir configured to receive and melt a print material, an ejector having a nozzle that is fluidly connected to the reservoir to receive melted print material from the reservoir, a platform or substrate positioned opposite the ejector, at least one actuator operatively connected to at least one of the platform and the ejector, the at least one actuator being configured to move the at least one of the platform and the ejector relative to one another, and a controller operatively connected to the reservoir, the ejector, and the at least one actuator, the controller being configured to form a first layer, the first layer comprising at least one material chosen from an article material, a support structure material and an interfacial material, form an additional layer on the first layer, the additional layer comprising at least one material chosen from the article material, the support structure material and the interfacial material, and repeat the previous step one or more times to form a three-dimensional build comprising an article and at least one support structure attached to the article at an interface, the interface comprising the interfacial material formed during one or more of the preceding steps, the interfacial material comprising a polymer. In exemplary examples of the additive manufacturing system, the interfacial material includes a polyaryletherketone (PAEK), a polybenzimidazole (PBI), a polycarbosilane (PCS), or a combination thereof. This additive manufacturing system can form a printed article, including a three-dimensional article, a support structure attached to at least a portion of the three-dimensional article, and an interfacial material affixed between the three-dimensional article and the support structure, and wherein the interfacial material comprises a polymer. In examples, the interfacial material further comprises a reinforcing filler or a polyaryletherketone (PAEK). Illustrative examples of glass materials may include, but are not limited to boric oxide (450° C. melting point), phosphorus pentoxide (340° C. melting point), and manganese dioxide (353° C. melting point), combinations thereof, and the like.

Figure 2:
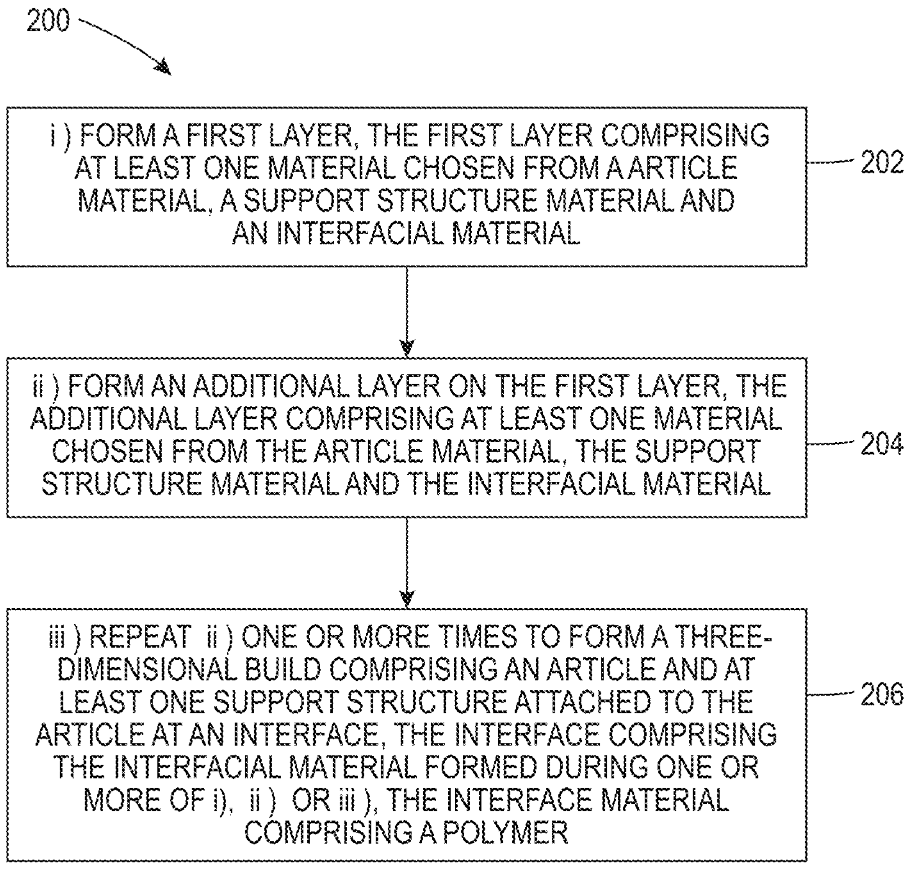
FIG. 2 is a flow chart of a method of additive manufacturing, in accordance with the present disclosure.

FIG. 2 is a flow chart of a method of additive manufacturing, in accordance with the present disclosure. A method of additive manufacturing 200 includes the steps of i) forming a first layer, the first layer comprising at least one material chosen from an article material, a support structure material and an interfacial material 202, ii) forming an additional layer on the first layer, the additional layer comprising at least one material chosen from the article material, the support structure material and the interfacial material 204, and iii) repeating ii) one or more times to form a three-dimensional build comprising an article and at least one support structure attached to the article at an interface, the interface comprising the interfacial material formed during one or more of i), ii) or iii), and the interfacial material comprising a polymer 206. In examples, the method of additive manufacturing 200 includes where the interfacial material comprises a polyaryletherketone (PAEK), such as polyether ether ketone (PEEK). In other examples, the method of additive manufacturing 200 includes where the interfacial material comprises a material selected from polytetrafluoroethylene (PTFE), polybenzimidazole (PBI), polyetherimide (PEI), polycarbosilane (PCS), or a combination thereof. The article material comprises a meta I, such as an alloy of aluminum. In other examples of the method of additive manufacturing 200, the article material includes a material chosen from glass, salt, or a combination thereof. In examples, the interfacial material is deposited by printing or ejection, or alternatively the interfacial material is deposited by sheet dropping. The method of additive manufacturing 200 can include removing a portion of the article from another portion of the article at an interface location. The method of additive manufacturing 200 can include depositing the interfacial material while the article is at an elevated temperature or maintaining a portion of the article at an elevated temperature while forming the interfacial material. In examples, the support structure material can include a metal, a glass, a salt, or a combination thereof.

In examples, the interfacial material is processed at or above the melting temperature of the interfacial material. For example, PEEK, when used as an interfacial material, cannot be deposited onto the aluminum at room temperature. It is required that the substrate is maintained at the melting temperature of the PEEK during PEEK depositing or printing to achieve sufficient wetting and deposition. In examples, the inorganic material can be aluminum, alloys thereof, or other materials described as printing materials herein. In examples, when at the molten condition for the inorganic printing material that forms the article, the printed aluminum shows great wettability with the PEEK and is stable to build onto with other materials as required. In other examples, the printing inorganic material that forms the article or support structure can include salt, such as sodium nitrate ($NaNO_3$) or glass such as diboron trioxide ($B_2O_3$). Illustrative examples of glass can include boric oxide, phosphorus pentoxide, and manganese dioxide.

In examples where salt and/or glass printing is conducted this would indicate that a PEEK substrate at melting conditions helps the interface with the printed inorganic, with wettability and bonding improved. Further in the use of PEEK support materials for printed aluminum, an approximate 1 mm thick 10% by weight (based on a total weight) carbon fiber loaded PEEK is printed to evaluate its ability as a support structure. After the aluminum printing and quenching, an entire piece can be removed from the substrate. For removal of a PEEK interfacial material from printed aluminum, the material can be peeled at 300° C. from a reachable or accessible area of the printed article. In the instance where the part or article includes an unreachable or inaccessible area, burning at 565° C. can be employed to remove or separate the article at the interface comprising the polymer-based material, PEEK for example. The interfacial material can be deposited in any part of the article, such as by printing, molding, or spraying. Depending by the type of inorganic material, its deposition temperature can range from about 300° C., such as for $NaNO_3$ to about 660° C., such as for aluminum, to about 1100° C., such as for copper. A material that can be melded into the deposition procedure and used as a temporary interface or a mold can extend the complexity of the shape of the deposited inorganic material. The use or removal of a high-temperature resistant polymer as an interface or boundary to hold the drops of the molten inorganic materials, metal, salt, ceramic can be used in a temperature range beyond the glass transition temperature of the polymer when used as a material interface.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms “including.” “includes,” “having.” “has,” “with,” or variants thereof are used in either the detailed description and the claims, such terms are intended to be inclusive in a manner similar to the term “comprising.” The term “at least one of” is used to mean one or more of the listed items may be selected. Further, in the discussion and claims herein, the term “on” used with respect to two materials, one “on” the other, means at least some contact between the materials, while “over” means the materials are in proximity, but possibly with one or more additional intervening materials such that contact is possible but not required. Neither “on” nor “over” implies any directionality as used herein. The term “conformal” describes a coating material in which angles of the underlying material are preserved by the conformal material. The term “about” indicates that the value listed may be somewhat altered, as long as the alteration does not result in nonconformance of the process or structure to the illustrated embodiment. The terms “couple,” “coupled,” “connect,” “connection,” “connected,” “in connection with,” and “connecting” refer to “in direct connection with” or “in connection with via one or more intermediate elements or members.” Finally, the terms “exemplary” or “illustrative” indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A method of additive manufacturing, the method comprising:

i) forming a first layer, the first layer comprising at least one material chosen from an article material, a support structure material, and an interfacial material;

ii) forming an additional layer on the first layer, the additional layer comprising an interfacial material, wherein forming the interfacial material comprises depositing the interfacial material in a molten state while maintaining at least a portion of the article material or the support structure material at an elevated temperature sufficient to keep the interfacial material above its melting point during deposition to promote wetting of the article material; and iii) repeating ii) one or more times to form a three-dimensional build comprising an article comprising the article material and at least one support structure comprising the support structure material attached to the article at an interface, the interface comprising the interfacial material formed during ii), the interfacial material comprising a high-temperature polymer having a melting point above 300° C., wherein the article material comprises a material chosen from a metal, a glass, a salt, or a combination thereof, and the support structure material comprises a material chosen from a metal, a glass, a salt, or a combination thereof.

2. The method of additive manufacturing of claim 1, wherein the interfacial material comprises a polyaryletherketone (PAEK).

3. The method of additive manufacturing of claim 1, wherein the interfacial material comprises polyether ether ketone (PEEK).

4. The method of additive manufacturing of claim 1, wherein the interfacial material comprises a material selected from polytetrafluoroethylene (PTFE), polybenzimidazole (PBI), polyetherimide (PEI), polycarbosilane (PCS), or a combination thereof.

5. The method of additive manufacturing of claim 1, wherein the article material comprises a metal.

6. The method of additive manufacturing of claim 1, wherein the article material comprises an alloy of aluminum.

7. The method of additive manufacturing of claim 1, wherein the article material comprises a material chosen from glass, salt, or a combination thereof.

8. The method of additive manufacturing of claim 1, wherein the interfacial material is deposited by ejection.

9. The method of additive manufacturing of claim 1, further comprising separating the article from the at least one support structure at the interface.

10. The method of additive manufacturing of claim 1, further comprising forming the interfacial material while maintaining at least a portion of the article material or the support structure material at a temperature of from 300° C. to 900° C.

11. The method of additive manufacturing of claim 10, further comprising maintaining a portion of the article at temperature of from 340° C. to 450° C. while forming the interfacial material.

12. The method of additive manufacturing of claim 1, wherein the support structure material comprises a salt.

* * * * *